United States Patent [19]
Yamasaki et al.

[11] Patent Number: 5,109,068
[45] Date of Patent: Apr. 28, 1992

[54] STYRENE-BASED POLYMER COMPOSITION, STRETCHED MOLDING THEREOF AND PROCESS FOR PRODUCING THE SAME

[75] Inventors: Komei Yamasaki, Sodegaura; Keisuke Funaki, Ichihara; Akikazu Nakano, Ichihara; Takashi Sumitomo, Ichihara, all of Japan

[73] Assignee: Idemitsu Kosan Co., Ltd., Tokyo, Japan

[21] Appl. No.: 389,258

[22] Filed: Aug. 2, 1989

[30] Foreign Application Priority Data

Aug. 31, 1988 [JP] Japan .................. 63-215095
Sep. 30, 1988 [JP] Japan .................. 63-244581
Sep. 30, 1988 [JP] Japan .................. 63-244583

[51] Int. Cl.$^5$ .................. C08L 27/22; C08L 71/12
[52] U.S. Cl. .................. 525/151; 264/210.1; 524/371; 525/68; 525/132; 525/152; 525/905
[58] Field of Search .................. 525/132, 905, 151, 152

[56] References Cited

U.S. PATENT DOCUMENTS

| | | | |
|---|---|---|---|
| 3,356,761 | 12/1967 | Fox .................. | 525/905 |
| 3,373,226 | 3/1968 | Gowan .................. | 525/905 |
| 3,959,211 | 5/1976 | Cooper et al. . | |
| 4,680,353 | 7/1987 | Ishihara et al. . | |
| 4,946,897 | 8/1990 | Albizzati et al. .................. | 525/132 |

FOREIGN PATENT DOCUMENTS

0262615 4/1988 European Pat. Off. .
0291915 11/1988 European Pat. Off. .
0314146 5/1989 European Pat. Off. .

OTHER PUBLICATIONS

"Plastics Extrusion Technology", 2nd Ed. Allan L. Griff, consultant, Reinhold Book Corp., (1962) p. 116.

*Primary Examiner*—Jacob Ziegler
*Attorney, Agent, or Firm*—Frishauf, Holtz, Goodman & Woodward

[57] ABSTRACT

There is disclosed a styrene-based polymer composition which comprises
  (A) 10 to 98% by weight of a styrene-based polymer having syndiotactic configuration with a racemic pentad of 30% or more and
  (B) 90 to 2% by weight of polyphenylene ether having an intrinsic viscosity of 0.28 dl/g or more at 30° C. in chloroform.

Also, a flame retarder, a flame-retardant aid, a rubber-like elastomer or an inorganic filler may optionally be added to the composition.

Further, also disclosed is a stretched molding comprising stretching the above composition.

7 Claims, No Drawings

STYRENE-BASED POLYMER COMPOSITION, STRETCHED MOLDING THEREOF AND PROCESS FOR PRODUCING THE SAME

BACKGROUND OF THE INVENTION

1. Field of the Invention

This invention relates to a styrene-based polymer composition, a stretched molding thereof and a process for producing the same. More specifically, it relates to a styrene-based polymer composition which is suitable for materials such as the exterior trim parts of an automobile, engine compartment parts, machine parts, electric and electronic parts, domestic kitchenware, etc. a stretched molding thereof and a process for efficiently producing the stretched molding.

2. Description of the Related Arts

Heretofore, a composition which comprises a polyphenylene ether resin (polyphenylene oxide) (hereinafter referred to as "PPE") and a styrene-based polymer has been widely used as engineering plastics which are excellent in mechanical properties and heat resistance. Such compositions have been described in, for example, Japanese Patent Applications Laid-Open No. 5085/1971 and No. 39457/1972, and U.S. Pat. No. 3,383,435.

However, these compositions have serious drawbacks in that solvent resistance, particularly resistance to aromatic hydrocarbon type solvents, is small, whereby their uses are limited. This can be considered as an essential drawback belonging to the styrene-based polymer having atactic configuration as one component of the composition.

Also, PPE generally has self-extinguishing properties and therefore, a resin composition containing PPE also has flame retardance to some degree. However, demands on flame retardance in electric and electronic fields and automobile fields in recent years has become increasingly severe, so that the above demands cannot be satisfied with the flame retardance due to the self-extinguishing properties which PPE originally has.

In general, styrene-based polymers have been prepared by radical polymerization. The styrene-based polymers thus prepared have atactic configuration in streoregularity. However, in such styrene-based polymers, improvement in physical properties by stretching cannot be expected. Also, styrene-based polymers having isotactic configuration in stereoregularity have also been known and an attempt to stretch the polymer has been made (Polymer Chemistry, vol., 21, p. 206 (1964)). However, the styrene-based polymers have a slow crystallization rate and its crystalline structure is helical so that a sufficient stretching effect cannot be essentially obtained.

The group of the present inventors' has proposed a process for producing a film-like molding by stretching a styrene-based polymer having mainly syndiotactic configuration and a resin composition comprising the above styrene-based polymer and other thermoplastic resins and/or rubber in Japanese Patent Applications No. 3847/1988, No. 4921/1988, No. 4923/1988 and No. 4924/1988. In these applications, a low molecular weight PPE having a molecular weight of 10,000 or less is disclosed as one example of the thermoplastic resin.

However, after further investigation concerning the composition, it has found that there is room for further improvement since mechanical properties, solvent resistance and flame retardance are insufficient due to the low molecular weight of PPE.

Also, as proposed in the above Japanese Patent Application No. 3847/1988, the above styrene-based polymer becomes a stretched molding having excellent transparency and high modulus of elasticity by stretching. However, this stretched molding has a disadvantage in that its mechanical strength is low, as compared with stretched polyester film or polyamide film. Therefore, in order to improve its mechanical strength, an attempt of blending the aforesaid styrene-based polymer having syndiotactic configuration with other resins (particularly a low molecular weight PPE) has been made (Japanese Patent Application No. 4921/1988).

However, according to research thereafter, it has been found that this blended material is still insufficient in mechanical strength of its stretched molding due to the low molecular weight of PPE.

SUMMARY OF THE INVENTION

An object of the present invention is to provide a styrene-based polymer composition which can produce a molding improved in mechanical properties and solvent resistance.

Also, another object of the present invention is to provide a styrene-based polymer composition which is excellent in the above mechanical properties and solvent resistance as well as flame retardance.

Further, other object of the present invention is to provide a stretched molding which is excellent in mechanical properties and solvent properties while maintaining transparency, high elasticity and electric characteristics which the styrene-based polymer has originally.

Moreover, a still further object of the present invention is to provide a process for producing the above stretched molding with good efficiency.

The present invention is to provide a styrene-based polymer composition which comprises (A) 10 to 98% by weight of a styrene-based polymer having syndiotactic configuration with a racemic pentad of 30% or more and (B) 90 to 2% by weight of PPE having an intrinsic viscosity of 0.28 dl/g or more at 30° C. in chloroform.

Also, the present invention is to provide a stretched molding prepared by stretching the above resin composition.

Further, the present invention is to provide a process for producing a stretched molding, which comprises heat melting the above composition, quenching the molten composition to a temperature lower than a glass transition temperature of the composition to form a sheet, and then subjecting the sheet to a stretching treatment with heating to a temperature between the glass transition temperature and a melting point of the composition.

DESCRIPTION OF PREFERRED EMBODIMENTS

The styrene-based polymer composition of the present invention comprises the above components (A) and (B) as main components. Here, the component (A) is a styrene-based polymer having syndiotactic configuration with a racemic pentad of 30% or more, and the syndiotactic configuration means that a stereostructure is mainly syndiotactic, i.e., the stereostructure in which phenyl groups or substituted phenyl groups as side chains are located alternately at opposite directions relative to the main chain consisting of carbon-carbon bonds. The tacticity is quantitatively determined by the nuclear magnetic resonance method using carbon isotope ($^{13}$C-NMR) method. The tacticity as determined by the $^{13}$C-NMR method can be indicated in terms of proportions of structural units continuously connected to each other, i.e., a diad in which two structural units are connected to each other, a triad in which three structural units are connected to each other, or a pentad in which five structural units are connected to each other. Styrene-based polymers having the syndiotactic configuration of the present invention include polystyrene, poly(alkylstyrene), poly(halogenated styrene), poly(alkoxystyrene), poly(vinyl benzoate) and the mixtures thereof, and copolymers containing the above polymers as one of the components, having such a syndiotacticity that the proportion of racemic pentad is 30% or more, preferably 50% or more. The poly(alkylstyrene) can include poly(methylstyrene), poly(ethylstyrene), poly(isopropylstyrene), poly(tert-butylstyrene), poly(divinyl benzene), etc.; the poly(halogenated styrene) can include poly(chlorostyrene), poly(bromostyrene), poly(fluorostyrene), etc. Also, the poly(alkoxystyrene) can include poly(methoxystyrene), poly(ethoxystyrene), etc. Among these, particularly preferred styrene-based polymers include polystyrene, poly(p-methylstyrene), poly(m-methylstyrene), poly(p-tert-butylstyrene), poly(p-chlorostyrene), poly(m-chlorostyrene), poly(p-fluorostyrene), poly(divinyl benzene), and further a copolymer comprising at least one of the above polymers as partial component (Japanese Patent Application Laid-Open No. 187708/1987).

The molecular weight of the styrene-based polymer to be used in the present invention is not specifically limited, but the styrene-based polymer having a weight average molecular weight of 10,000 or more is preferred, and particularly that of 50,000 to 1,000,000 is optimum. If the weight average molecular weight is less than 10,000, mechanical properties are inferior and there is a tendency of lacking solvent resistance. Further, the molecular weight distribution thereof is also not limited, and the styrenebased polymer having various ranges can be used. Such a styrene-based polymer having syndiotactic configuration, has a melting point of 160° to 310° C. and is extremely excellent in heat resistance, as compared with the conventional styrene-based polymer having atactic configuration.

Such a styrene-based polymer having syndiotactic configuration can be prepared by, for example, polymerizing a styrene-based monomer (a monomer corresponding to the above styrene-based polymer) using a titanium compound and a condensate product of water and trialkylaluminum as catalysts in an inert hydrocarbon solvent or in the absence of a solvent (see U.S. Pat. No. 4,680,353).

On the other hand, the component (B) to be used in the present invention is represented by the following formula:

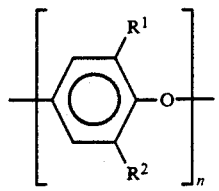

wherein $R^1$ and $R^2$ may be the same or different and each represent an alkyl group having 1 to 6 carbon atoms, an aryl group having 6 to 8 carbon atoms, a halogen atom or a hydrogen atom, and n is an integer of 50 to 500, preferably 100 to 450.

Specific examples of such polyphenylene ether resins include poly(2,6-dimethyl-1,4-phenylene)ether; poly(2,6-diethyl-1,4-phenylene)ether; poly(2-methyl-6-ethyl-1,4-phenylene)ether; poly(2-methyl-6-isopropyl-1,4-phenylene)ether; poly(2-methyl-1,4-phenylene)ether; poly(2,6-dichloro-1,4-phenylene)ether; poly(2-ethyl-6-bromo-1,4-phenylene)ether; poly(2-phenyl-1,4-phenylene)ether, etc. Among these, poly(2,6-dimethyl-1,4-phenylene)ether is particularly suitable. PPE to be used in the present invention is required to have an intrinsic viscosity in chloroform at 30° C of 0.28 dl/g or more, and preferably 0.3 to 0.66 dl/g. If the intrinsic viscosity is less than 0.28 dl/g, mechanical properties and solvent resistance become insufficient.

The composition of the present invention comprises the above component (A) and component (B) as main components, and the blending ratio of both components is 10 to 98% by weight, preferably 20 to 95% by weight, more preferably 30 to 95% by weight of the component (A) and 90 to 2% by weight, preferably 80 to 5% by weight, more preferably 70 to 5% by weight of the component (B). If the component (A) is less than 10 % by weight, solvent resistance is low and if it exceeds 98% by weight, elongation (toughness) is low. Also, if the component (B) exceeds 90% by weight, solvent resistance is low and the thermal degradation of PPE becomes remarkable so that molding becomes difficult, and if it is less than 2% by weight, elongation is low.

The composition of the present invention basically comprises the above components (A) and (B), but if necessary, its flame retardance can be improved by adding a flame retarder as a component (C) and a flame-retardant aid as a component (D).

As the above flame retarder, various ones may be mentioned, but halogen-based flame retarders and phosphorus-based flame retarders are particularly preferred. The halogen-based flame retarders include, for example, tetrabromobisphenol A, tetrabromophthalic anhydride, hexabromobenzene, tribromophenylallyl ether, pentabromotoluene, pentabromophenol, tribromophenyl-2,3-dibromo propyl ether, tris(2,3-dibromopropyl)phosphate, tris(2-chloro-3-bromopropyl)phosphate, octabromodiphenyl ether, decabromodiphenyl ether, octabromobiphenyl, pentachloropentacyclodecane, hexabromocyclododecane, hexachlorobenzene, pentachlorotoluene, hexabromobiphenyl, decabromobiphenyl, decabromobiphenyl oxide, tetrabromobutane, decabromodiphenyl ether, hexabromodiphenyl ether, ethylenebis-(tetrabromophthalimide), tetrachlorobisphenol A, tetrabromobisphenol A, oligomer of tetrachlorobisphenol A or tetrabromobisphenol A, halogenated polycarbonate oligomer such as brominated polycarbonate oligomer, halogenated epoxy compound, polychlorostyrene, brominated polystyrene such as poly(tribromostyrene), poly(dibromophenylene oxide), bis(tribromophenoxy)ethane, etc.

On the other hand, the phosphorus-based flame retarders include, for example, ammonium phosphate, tricresyl phosphate, triethyl phosphate, acidic phosphate, triphenylphosphene oxide, etc.

As the flame retarders among these, poly (tribromostyrene), poly(dibromophenylene oxide) and decabromodiphenyl ether are particularly preferred.

The above component (C) (flame retarder) is blended at a ratio of 3 to 40 parts by weight, preferably 5 to 35 parts by weight, more preferably 10 to 35 parts by weight based on 100 parts by weight of the components (A) and (B) (total amount).

If the blending ratio of the component (C) is less than 3 parts by weight, flame retardance of the resulting composition is insufficient.

On the other hand, if it is added in excess of 40 parts by weight, flame retardance is not improved according to the ratio added, but rather the mechanical properties and solvent resistance are undesirably lowered.

As the flame-retardant aids, various ones may be mentioned, and they include, for example, antimony flame-retardant aids such as antimony trioxide, antimony pentoxide, sodium antimonate, metal antimony, antimony trichloride, antimony pentachloride, antimony trisulfide, antimony pentasulfide, etc. Also, in addition to the above, there may be mentioned zinc borate, barium metaborate, zirconium oxide, etc.

Among these, as the component (D), antimony trioxide is particularly preferred.

The component (D) (flame-retardant aid) is blended with a ratio of 1 to 15 parts by weight, preferably 2 to 10 parts by weight based on 100 parts by weight of the components (A) and (B) (total amount).

If the blending ratio of the component (D) is less than 1 part by weight, the effects due to the flame-retardant aid are insufficient. On the other hand, if it exceeds 15 parts by weights, effects due to a flame-retardant aid are not improved according to the ratio added, but rather there exists the possibility of impairing other properties so that it is not preferred.

These components (C) and (D) are preferably blended in combination and when both components are used, a remarkably increased flame-retardant effect can be developed than in the case where only either one of the components (C) or (D) is used. Even small amounts of flame retarder and flame-retardant aid result in the increased flame-retardant effect since the component (B) is added.

Further, in the composition of the present invention, if necessary, a rubber-like elastomer and/or an inorganic filler may be blended as a component (E). These rubber-like elastomer and/or inorganic filler are blended in the above components (A) and (B) simultaneously with the above components (C) and (D), or separately from the components (C) and (D) so that mechanical properties, particularly impact resistance, etc. of the composition are further improved.

The rubber-like elastomer to be used as the component (E) may be various ones, but particularly suitable ones are a rubber-like copolymer containing a styrene-based compound as one component. There may be mentioned, for example, styrenebutadiene copolymer rubber (SBR), a rubber in which a part or all of the butadiene portion of a styrene-butadiene block copolymer is hydrogenated (SEBS), a styrene-isoprene copolymer rubber, a rubber in which a part or all of the isoprene portion of a styrene-isoprene block copolymer is hydrogenated, or as described in Japanese Patent Application No. 127100/1988, a granular elastomer obtained by polymerizing a vinyl-based monomer in the presence of the polymer obtained by polymerizing at least one monomer selected from the group consisting of an alkylacrylate, an alkylmetal methacrylate and a polyfunctional monomer having a conjugated diene type double bond, such as acrylonitrilestyrene grafted butadiene rubber (ABS), acrylonitrile-styrene grafted butadiene-butyl acrylate copolymer rubber (AABS), methyl methacrylate-styrene grafted butylacrylate rubber (MAS), styrene grafted butadiene rubber (SB), methyl methacrylate-styrene grafted butadiene rubber (MBS), methyl methacrylate-styrene grafted butadiene-butyl acrylate copolymer rubber (MABS), etc. Since these materials each have styrene structure, dispersibility in the above styrene-based polymer having syndiotactic configuration is good and as a result, improved effects in physical property are remarkable.

Further, examples of the rubber-like elastomer include, in addition to the above, natural rubber, polybutadiene, polyisoprene, polyisobutyrene, neoprene, ethylene-propylene copolymer rubber, polysulfide rubber, thiokol rubber, acrylic rubber, urethane rubber, silicone rubber and epichlorohydrin.

The above rubber-like elastomer is blended in the ratio of 5 to 85 parts by weight, preferably 10 to 50 parts by weight based on 100 parts by weight of the components (A) and (B) (total amount). Mechanical properties, particularly impact resistance, are further improved by blending the rubber-like elastomer. If the blending ratio is less than 5% by weight, improvements in impact resistance or stretch are insufficient, while if it exceeds 85 parts by weight, improvements in heat resistance and solvent resistance are low.

As for the inorganic filler which can be used in place of the above rubber-like elastomer, or with the rubber-like elastomer as the component (E) in the present invention, it may be in the form of fiber, particles or powders. The fibrous inorganic filler includes glass fiber, carbon fiber, alumina fiber, etc., and glass fiber and carbon fiber are particularly preferred. As the shape of the glass fiber, there can be mentioned cross state, mat state, bundling cut state, short fiber, filament state, etc., but preferably the bundling cut state having a length of 0.05 mm to 13 mm and a diameter of the fiber of 5 to 20 $\mu$m, and particularly preferred are those which are treated with a silane series agent. Also, the carbon fibers preferably include polyacrylonitrile (PAN)-based ones, more preferably bundled materials of chopped fiber type having a length of 3 mm or so and a diameter of 7 to 15 $\mu$m.

On the other hand, as the particle and powder inorganic fillers, there can be mentioned talc, carbon black, graphite, titanium dioxide, silica, mica, calcium carbonate, calcium sulfate, barium carbonate, magnesium carbonate, magnesium sulfate, barium sulfate, oxysulfate, tin oxide, alumina, kaolin, silicon carbide, metal powder, etc., and talc, calcium carbonate and mica are particularly preferred. A preferred average particle size of talc is 0.3 to 20 $\mu$m, more preferably 0.6 to 10 $\mu$m. A preferred average particle size of calcium carbonate is 0.1 to 20 $\mu$m. A preferred average particle size of mica is 40 to 250 $\mu$m, more preferably 50 to 150 $\mu$m.

The above inorganic filler is blended in a ratio of 1 to 250 parts by weight, preferably 10 to 150 parts by weight based on 100 parts by weight of the above components (A) and (B) (total amount). If the blended ratio of the inorganic filler is less than 1 part by weight, sufficient effects due to the filler cannot be observed. On the other hand, if it exceeds 250 parts by weight, the filler cannot be dispersed uniformly and the resulting composition becomes inferior in mechanical strength.

In the composition which comprises blending simultaneously the components (A) to (E), the component (C) is blended in a ratio of 3 to 40 parts by weight, preferably 5 to 35 parts by weight based on 100 parts by weight of the components (A) and (B) (total amount).

The reason why the blending ratio is specified is the same as described in the explanation concerning the composition comprising the above components (A) to (D).

Regarding the component (D), it is blended in the ratio of 1 to 15 parts by weight, preferably 2 to 10 parts by weight based on 100 parts by weight of the components (A) and (B) (total amount) as in the above. The reason why the blending ratio is specified is also as the same described in the explanation concerning the composition comprising the above components (A) to (D).

The compositions of the present invention are prepared by blending the above components (A) and (B), and if necessary, further blending the components (C) to (E). Various additives or other synthetic resins may further be blended, otherwise inhibiting the object of the present invention. As the aforesaid additive, there can be mentioned, for example, antioxidants such as phosphites and phosphates; UV absorbers such as benzotriazoles and benzophenones; external lubricants such as aliphatic carboxylates and paraffins; nuclear agents used conventionally, releasing agents, antistatic agents, coloring agents, etc. As the other synthetic resins, there can be mentioned resins such as polyethylene, polypropylene, polystyrene, AS resin, ABS resin, polymethylmethacrylate, etc.

The composition of the present invention can be obtained by blending the above components (A) and (B), and if necessary, the components (C) to (E), and further various desired components, and then kneading at an optional temperature, for example, between a melting point and a temperature 80° C higher than the melting point. The blending and kneading procedures at this time can be carried out according to the conventional method. More specifically, the fusion-kneading method by using a kneader, a mixing roll, a uniaxial (monoaxial) or biaxial extruder, Banbury mixer, Henschel mixer or a kneading roll, or the solution blending method, etc. These compositions are molded into a tridimensional molding by a general method, preferably by an injection molding machine.

Also, in the molding and the process for producing the same of the present invention, a raw molding material is prepared by blending the above components (A) and (B), and further, if necessary, blending other components in optional amounts. The raw material is generally molded by an extrusion molding, a calendar molding, or further subjected to injection molding in case of a blow molding or a blow stretch molding to form a preform for stretching (sheet, plate, film, tube, bottle, etc.). In this molding, the above raw material for molding is usually melted by heating and molded in the desired form by use of various molding machines, but the raw material for molding may be molded in a softened state without heat melting. The melting temperature of the raw material for molding is generally from its melting point to a temperature 80° C higher than its melting point. If the temperature is too high, undesirable problems occur, such as decomposition of the raw material for molding. Also, the thickness of the preform to be molded is not limited and is optionally selected, but generally it is usually chosen from the range of 5 mm or less, preferably 3 mm to 10 μm. If the thickness exceeds 5 mm, tension at stretching is large so that the stretching may sometimes become difficult. The crystallinity of the preliminary molding is 30% or lower, preferably 25% or lower.

In the process for producing the molding of the present invention, the above raw material for molding which has been heat melted is cooled at the time of molding for producing a preform having preferred crystallinity. Cooling should be carried out at a temperature lower than a temperature 30° C. above, preferably 20° C. above, the glass transition temperature of the composition. The cooling rate is 50 to 3° C./sec, preferably 50 to 5° C./sec.

In the process of the present invention, the preform thus obtained is heated to a temperature capable of effecting stretching. The temperature at this time should be set in the range between the glass transition temperature and the melting point of said composition.

Further, according to the process of the present invention, the preform heated to the temperature suitable for stretching is stretched uniaxially or biaxially. In the case of uniaxially stretching, the preform should be stretched at a draw ratio of at least 1.5-fold. If the draw ratio is less than 1.5-fold, strength and heat resistance become insufficient. Also, in the case of biaxially stretching, the preform should be stretched at a draw ratio of at least 1.2-fold to the respective stretching direction (biaxial direction). If the draw ratio is too small, strength and heat resistance of the resulting stretched molding become insufficient. In the above biaxially stretching, the preform may be stretched simultaneously in the machine direction (MD) and transverse direction (TD), or may be stretched sequentially in the desired order. As the means for stretching, there may be employed the means of tenter, milling, calendering, stretching between rolls, stretching due to gas pressure, etc.

In the process of the present invention, particularly in the case of biaxially stretching, the above raw material for molding can be directly subjected to inflation molding at the temperature of not more than its melting point without formation of a preform after heat melting to produce a biaxially stretched molding (e.g., a biaxially stretched film, etc.). In this inflation molding, it is effective so as to prevent melt fracture, roughness of surface and the like that the composition be maintained at a temperature of at least 20° C. higher than its melting point. If, however, the melt temperature is too high, degradation of the composition becomes remarkable so that it is preferred to set the temperature within the range of the melting point to a temperature 80° C. higher than the melting point. Further, the stretching temperature is preferably 5° to 150° C. lower than the melting point and more preferably 10° to 50° C. lower than the same. Also, if the blow-up ratio is decreased, uniaxially stretching is realized in inflation.

When the uniaxially stretching or biaxially stretching is carried out according to the process of the present invention, a stretched molding (sheet, plate, film, tube, bottle, etc.) having excellent heat resistance, solvent resistance and electric insulating properties can be obtained. Also, when dimensional stability at high temperature, and heat resistance is required, it is preferred to further carry out annealing. The annealing can be carried out by a conventional method, but the stretched molding is subjected to annealing under tension at a temperature ranging from 100° C., preferably a temperature higher than the glass transition temperature of said composition, to the melting point. By annealing at temperatures lower than glass transition temperature, thermal properties of the stretched molding cannot be improved, while at the temperature more than the melting point, the stretched molding is fused. The annealing is usually carried out for 0.5 seconds to 100 hours, preferably 0.5 seconds to 10 hours, further preferably 0.5 to 300 seconds. This annealing further increases heat resistance, dimensional stability, etc. of the stretched molding.

As described above, the styrene-based polymer composition comprising the styrene-based polymer and the polyphenylene ether resin of the present invention is remarkably excellent in solvent resistance. Further, the composition blended with the rubber-like elastomer is well balanced in mechanical properties, heat resistance, solvent resistance, etc.

Also, the resin composition of the present invention in which the flame retarder or the flame-retardant aid is further added, has sufficient flame retardance and also excellent mechanical properties, solvent resistance, etc.

Further, the stretched molding of the composition of the present invention has excellent mechanical strength and elongation while maintaining transparency, high modulus of elasticity and electric properties.

Accordingly, the composition of the present invention can be utilized for various fields including automobile parts such as exterior trim parts of an automobile, engine compartment parts, etc., as engineering plastics, and further for various machine parts, electric and electronic parts, domestic kitchenwares, etc. Also, the stretched molding of the present invention can be expected to be effectively used such as a film for electric field, e.g., a film for a flexible print substrate, an encapsulation film, etc., and a general film for industrial use such as magnetic tape, hot stamping, decoration and others.

The present invention is described in greater detail with reference to the following examples.

REFERENCE EXAMPLE 1

Two liters of toluene as a solvent, and 5 mmol of tetraethoxytitanium and 500 mmol (as aluminum atom) of methylaluminoxane as catalyst components were placed in a reactor, and 15 L (L=liter) of styrene was added thereto at 5° C. and polymerized for 4 hours.

After polymerization, the reaction product was washed with a mixture of hydrochloric acid and methanol to decompose the catalyst components, and then dried to obtain 2.5 kg of a styrene-based polymer (polystyrene). The polymer was subjected to Soxhlet extraction using methyl ethyl ketone as a solvent to obtain 97% by weight of an extraction residue. Said residue had a weight average molecular weight of 400,000, a number average molecular weight of 180,000, and a melting point of 269° C. A nuclear magnetic resonance analysis using carbon isotope ($^{13}$C-NMR Analysis, Solvent: 1,2-dichlorobenzene) of the polymer showed an absorption at 145.35 ppm, ascribable to the syndiotactic configuration. The syndiotacticity in terms of racemic pentad as calculated from the peak area was 98%.

REFERENCE EXAMPLE 2

Poly(2,6-dimethyl-1,4-phenylene)ether powder was obtained from GEM Polymer CO., Ltd. Intrinsic viscosity of this powder in chloroform at 30° C. was 0.49 dl/g.

EXAMPLE 1

Zero point seven part by weight of (2,6-di-tert-butyl-4methylphenyl)pentaerythritol diphosphite (Trade Name: PEP-36, produced by Adeka Argus Co., Ltd.) and 0.1 part by weight of 2,6-di-tert-butyl-4-methylphenol (Trade Name: Sumilizer BHT, produced by Sumitomo Chemical Co., Ltd.) were added as antioxidants to 100 parts by weight of a resin mixture consisting of 50% by weight syndiotactic polystyrene (SPS) obtained in Reference Example 1 and 50% by weight poly(2,6-dimethyl-1,4-phenylene)ether described in Reference Example 2, and kneaded with a uniaxial kneading extruder, to be pelletized.

The resulting pellet was injection-molded into three kinds of test pieces, that is, test pieces for Izod impact strength test in accordance with JIS K-7110, tensile strength test in accordance with JIS K-7113 and bending test in accordance with JIS K-7203.

The piece bending test was dipped in a regular gasoline (Trade Name: Idemitsu Red Apollo, produced by Idemitsu Kosan Co., Ltd.) and left for 24 hours at room temperature. After that, its appearance and the ratio of weight change as defined below was evaluated. The results are shown in Table 1. The same dipping test was performed also with acetone, carbon tetrachloride, ethyl acetate and n-pentane. The results are shown in Table 1.

the ratio of weight change=(W.A.D.*1 − W.B D.)/W.B.D.*2

*1 W.A.D. : weight after dipping
*2 W.B.D. : weight before dipping

Further, the bending test piece was measured for bending strength, and the tensile strength test piece was measured for elongation. The results are shown in Table 2.

EXAMPLE 2

The procedure of Example 1 was repeated except that the proportion of SPS obtained Reference Example 1 and poly(2,6-dimethyl-1,4-phenylene)ether described in Reference Example 2 was 75%/25% by weight, to form test pieces. The results of a dipping test are shown in Table 1, and the results of measurements in bending strength and elongation are shown in Table 2.

EXAMPLE 3

The procedure of Example 1 was repeated except that 12.5 parts by weight of styrene grafted butadiene rubber (particle diameter: 0.7 μm, Trade Name: Metablen IP-2, produced by Mitsubishi Rayon Co., Ltd.) as rubber-like elastomer was added to 100 parts by weight of the resin mixture, to form test pieces. The results of a dipping test are shown in Table 1. Further, a tensile strength test, bending test and notched Izod impact test were conducted. The results are shown in Table 3.

EXAMPLE 4

The procedure of Example 2 was repeated except that 18.75 parts by weight of styrene grafted butadiene rubber (particle diameter: 0.7 μm, Trade Name: Metablen IP-2, produced by Mitsubishi Rayon Co., Ltd.) as rubber-like elastomer was added to 100 parts by weight of the resin mixture, to form test pieces. The results of a dipping test are shown in Table 1. Further, a tensile test, bending test and notched Izod impact test were conducted, and the results are shown in Table 3.

EXAMPLE 5

The procedure of Example 1 was repeated except that 60 parts by weight of MAS rubber (Trade Name: KM-330, produced by Rohm & Haas Company) as rubber-like elastomer was added to 100 parts by weight of the resin mixture consisting of 90% by weight SPS obtained in Reference Example 1 and 10% by weight poly(2,6-dimethyl-1,4-pheylene)ether described in Reference Example 2, to form test pieces. The results of a dipping test conducted on the said test pieces are shown in Table 1.

EXAMPLE 6

The procedure of Example 1 was repeated except that 35 parts by weight of SBS rubber (Trade Name: TR-1184, produced by Shell Chemical Co., Ltd.) as rubber-like elastomer was added to 100 parts by weight of the resin mixture consisting of 30% by weight SPS obtained in Reference Example 1 and 70% by weight poly(2,6-dimethl-1,4-phenylene)ether described in Reference Example 2, to form test pieces. The results of a dipping test conducted on the said test pieces are shown in Table 1.

EXAMPLE 7

Zero point seven part by weight of (2,6-tert-butyl-4-methylpheylene)pentaerythritol diphosphite (Trade Name: PEP-36, produced by Adeka Argus Chemicals Co., Ltd.) and 0.1 part by weight of 2,6-di-tert-butyl-4-methylphenol (Trade Name: Sumilizer, produced by Sumitomo Chemical Co., Ltd.) were added to 100 parts by weight of a rein mixture consisting of 90% weight SPS obtained in Reference Example 1 and 10% by weight poly(2,6-dimethyl-1,4-phenylene)ether described in Reference Example 2, and 43 parts by weight of glass fiber were mixed thereto further, and dry-blended. Then the blend was kneaded with the use of a twin screw kneading extruder, and pelletized.

The resulting pellet was made into three kinds of test pieces, that is, test pieces for Izod impact strength test bending test.

The result of a bending test and Izod impact test using the thus obtained test piece is shown in Table 3.

EXAMPLES 8 and 9

The procedure of Example 7 was repeated except that substances shown in Table 3 were compounded in prescribed ratios as components (A) to (E), to obtain various test pieces, which were evaluated for physical properties in the same manner as in Example 7. The results are shown in Table 3.

COMPARATIVE EXAMPLE 1

The procedure of Example 1 was repeated except that a styrene polymer resin having atactic configuration (Trade Name: Idemitsu Polystyrene US-305, produced by Idemitsu petrochemical Co., Ltd.) as a styrene-based polymer resin was used in place of syndiotactic polystyrnene, to form test pieces. The results of dipping test are shown in Table 1.

COMPARATIVE EXAMPLE 2

The procedure of Example 2 was repeated except that Polystyrene US-305 was used as styrene-based resin in place of syndiotactic polystyrene, to form test pieces. The results of a dipping test are shown in Table 1.

COMPARATIVE EXAMPLE 3

The procedure of Example 3 was repeated except that Polystyrene US-305 was used as a styrene-based resin in place of syndiotactic polystyrene, to form test pieces. The results of a dipping test are shown in Table 1.

COMPARATIVE EXAMPLE 4

The procedure of Example 4 was repeated except that Polystyrene US-305 was used a as styrene-based resin in place of syndiotactic polystyrene, to form test pieces. The results of a dipping test are shown in Table 1.

COMPARATIVE EXAMPLE 5

The procedure of Example 5 was repeated except that Polystyrene US-305 was used as a styrene-based resin in place of syndiotactic polystyrene, to form test pieces. The results of a dipping test are shown in Table 1.

COMPARATIVE EXAMPLE 6

The procedure of Example 6 was repeated except that Polystyrene US-305 was used as a styrene-based resin in place of syndiotactic polystyrene, to form test pieces. The results of dipping test are shown in Table 1.

COMPARATIVE EXAMPLE 7

The procedure of Example 1 was repeated except that the proportion of syndiotactic polystyrene obtained in Reference Example 1 and poly(2,6-dimethyl-1,4-phenylene)ether described in Reference Example 2 was 2%/98% by weight, to form test pieces. The results of dipping test are shown in Table 1.

COMPARATIVE EXAMPLE 8

The procedure of Example 1 was repeated except that poly(2,6-dimethyl-1,4-phenylene)ether described in Reference Example 2 was not used, but that an antioxidant having the same prescription as in Example 1 was added to 100 parts by weight of syndiotactic polystyrene obtained in Reference Example 1, to form test pieces. The results of measurements for bending strength and elongation are shown in Table 2.

COMPARATIVE EXAMPLE 9

The procedure of Example 2 was repeated except that a polyphenylene ether resin having a weight average molecular weight of 7200, and an intrinsic viscosity of 0.24 dl/g (produced by Scientific Polymer Products Incorporated, Catalogue No. V-100) was used as a polyphenylene ether resin, to form test pieces. The results of measurements for bending strength and elongation are shown in Table 2.

COMPARATIVE EXAMPLE 10

The procedure of Example 1 was repeated except that 25 parts by weight of styrene-grafted butadiene rubber (Trade Name: Mitsubishi Metablen IP-2, produced by Mitsubishi Rayon Co., Ltd.) to 100 parts by weight of SPS obtained in Reference Example 1, but that polyphenylene ether resin was not added. The test pieces thus obtained were subjected to a tensile strength test, bending test, and notched Izod impact test, of which results are shown in Table 3.

COMPARATIVE EXAMPLE 11

The procedure of Example 1 was repeated except that 100 parts by weight of SBS rubber (Trade Name: TR-1184, produced by Shell Chemical Co., Ltd.) was added to 100 parts by weight of a resin mixture consisting of 50% by weight SPS obtained in Reference Example 1 and 50% by weight poly (2,6-dimethyl-1,4-phenylene)ether described in Reference Example 2, but the resulting mixture was too soft at injection molding to release.

EXAMPLE 10

Zero point seven part by weight of (2,6-di-tert-butyl-4-methylphenylene)pentaerythritol diphosphite (Trade Name: PEP36, produced by Adeka Argus Chemicals Co., Ltd.) and 0.1 part by weight of 2,6-di-tert-butyl-4-methylphenol (Trade Name: Sumilizer, produced by Sumitomo Chemical Co., Ltd.) were added to 100 parts by weight of a resin mixture consisting of 50% by weight SPS obtained in Reference Example 1 and 50% by weight poly(2,6-dimethyl-1,4-phenylene)ether described in Reference Example 2, and 12 parts by weight of polytribromostyrene and 3 parts by weight of antimony trioxide ($Sb_2O_3$) were mixed thereto further, and dry-blended. Then the blend was kneaded with the use of a twin screw kneading extruder, and pelletized.

The resulting pellet was made into three kinds of test pieces, that is, test pieces for tensile strength test, bending test, and flame retardance test in accordance with UL-94.

The results of a flame retardance test using the thus obtained test piece is shown in Table 4.

The results of dipping the bending test pieces in a regular gasoline similar to that of Example 1 are shown in Table 5. Moreover, elongation and tensile strength of the test piece were measured, respectively. The results are shown in Table 5.

EXAMPLES 11 to 18 and COMPARATIVE EXAMPLES 12 and 13

The procedure of Example 10 was repeated except that the substances shown in Table 4 were compounded in prescribed ratios as components (A) to (E), to obtain various test pieces, which were evaluated for physical properties in the same manner as in Example 10. The results are shown in Tables 4 and 5.

REFERENCE EXAMPLE 3

Two liters of toluene as a solvent, and 1 mmol of cyclopentadienyltitanium trichloride and 0.8 mol (as aluminum atom) of methylaluminoxane as catalyst components were placed in a reactor, and 3.6 L of styrene was added at 20° C and polymerized for 1 hour.

After the polymerization, the reaction product was washed with a mixture of hydrochloric acid and methanol to decompose and remove the catalyst components, and then dried to obtain 330 g of a styrene-based polymer (polystyrene).

Said polymer was subjected to Soxhlet extraction using methyl ethyl ketone as a solvent to obtain 95% by weight of an extraction residue. The polymer had a weight average molecular weight of 290,000, a number average molecular weight of 158,000 and a melting point of 270° C. A $^{13}C$-NMR analysis showed an absorption at 145.35 ppm, ascribable to the syndiotactic configuration, and the syndiotacticity in terms of pentad as calculated from the peak area was 96%.

EXAMPLE 19

Poly(2,6-dimethyl-1,4-phenylene)ether having an intrinsic viscosity of 0.32 dl/g was blended to the syndiotactic polystyrene (SPS) obtained in Reference Example 3 in the proportion of 5%/95% by weight, wherein 0.7 part by weight of (2,6-di-tert-butyl-4-methylphenyl)pentaerythritol diphosphite (Trade Name: PEP-36, produced by Adeka Argus Chemical Co., Ltd.) and 0.1 part by weight of tetrakis (methylene(3,5-di-tert-butyl-4-hydroxyphenyl)-propionate) methane (Trade Name: Irganox 1010, produced by Ciba Geigy Corporation, Japan) were added. The glass transition temperature of the resulting composition was 96° C.

Subsequently, the resulting composition was melted at 300° C. to be press-molded, and then cooled to 25° C. in 30 seconds, to obtain a transparent sheet with the thickness of 300 μm. The sheet thus obtained was preheated at 120° C. in a table tenter for 5 minutes, to be uniaxially stretched at a draw ratio of four. The physical properties of the resulting film are shown in Table 6.

EXAMPLE 20

The procedure of Example 19 was repeated except that the sheet obtained in Example 19 was uniaxially stretched at a draw ratio of two. Physical properties of the resulting film are shown in Table 6.

EXAMPLE 21

The stretched film obtained in Example 19 was heat-treated under tension at 250° C. for 30 seconds. Physical properties of the resulting film are shown in Table 6.

COMPARATIVE EXAMPLE 14

The procedure of Example 19 was repeated except that the proportion of SPS was 99% by weight and that of PPE was 1% by weight, to prepare a composition. Said composition was melted to mold at 300° C., and then quenched to 25° C., to obtain a transparent sheet with a thickness of 300 μm. The sheet thus obtained was preheated in a table tenter at 120° C. for 5 minutes, and then uniaxially stretched at a draw ratio of four. Physical properties of the stretched film are shown in Table 6.

EXAMPLE 22

The procedure of Example 19 was repeated except that the proportion of SPS and PPE was 80%/20% by weight. Physical properties of the resulting film are shown in Table 6.

EXAMPLE 23

The sheet used in Example 22 was preheated in a table tenter at 120° C. for 30 seconds, and biaxially stretched to 3.5 ×3.5 times the original. Physical properties of the stretched film are shown in Table 6.

EXAMPLE 24

The film obtained in Example 23 was heat-treated (annealed) at 250° C. for 30 seconds under tension. Physical properties of the resulting film are shown in Table 6.

REFERENCE EXAMPLE 4

Two liters of toluene as reaction solvent, 5 mmol of tetraethoxytitanium and 500 mmol (as aluminum atom) of methylaluminoxane as catalyst components were placed in a reactor, 15 L of styrene was added at 50° C., and the resulting mixture was polymerized for 4 hours.

After completion of the reaction, the product was washed with a mixture of hydrochloric acid and methanol to decompose and remove the catalyst components. Subsequently the residue was dried, to obtain 2.5 kg of styrene-based polymer (polystyrene). Then the polymer was subjected to Soxhlet extraction with methyl ethyl ketone as solvent, to obtain an extraction residue in 95% by weight, having a weight average molecular weight of 800,000. A $^{13}C$-NMR analysis (solvent: 1,2-dichlorobenzene) of the polymer showed an absorption at 145.35 ppm, ascribable to syndiotactic configuration, and the syndiotacticity in terms of racemic pentad calculated from the peak area was 96%.

EXAMPLE 25

SPS obtained in Reference Example 4 and poly(2,6-dimethyl-1,4-phenylene)ether having an intrinsic viscosity of 0.49 dl/g (produced by GEM Polymer Co., Ltd.) were blended in a proportion of 50%/50% by weight, and an antioxidant in the same amount as in Example 19 was added. The resulting composition was melted at 300° C. and compression-molded. Subsequently, the molding was cooled with a chill roll having the surface temperature of 25° C., to produce a transparent sheet with a thickness of 300 μm. The resulting sheet was preheated at 170° C. in a table tenter for 5 minutes, stretched biaxially to 3.5×3.5 times the original, to obtain a film. The physical properties of the stretched film are shown in Table 6.

EXAMPLE 26

SPS obtained in Reference Example 4 and PPE same as in Example 25 were blended in the proportion of 15%/85% by weight, and an antioxidant in the same amount as in Example 19 was added. Resulting composition was melted at 300° C., compression-molded, and then quenched to 25° C., to obtain a sheet with a thickness of 300 μm. Said sheet was preheated in a table tenter at 190° C. for 30 seconds, stretched biaxially to 3.5×3.5 times the original, to obtain a film. Physical properties of the film are shown in Table 6.

COMPARATIVE EXAMPLE 15

SPS obtained in Reference Example 4 and the same PPE as in Example 25 are blended in the proportion of 5%/95% by weight, and an antioxidant in the same amount as in Example 19 was added. The resulting composition was melted at 300° C., compression-molded, and quenched to 25° C., but the sample sticked so hard to the press board that no sheet was obtained.

TABLE 1

| | Component A | | Component B | | Component E | |
|---|---|---|---|---|---|---|
| No | Styrene-based Polymer | wt % | PPE resin[1] | wt % | Rubber-like elastomer | part by weight[2] |
| Example 1 | Syndiotactic | 50 | Intrinsic viscosity 0.49 | 50 | None | — |
| Example 2 | Syndiotactic | 75 | Intrinsic viscosity 0.49 | 25 | None | — |
| Example 3 | Syndiotactic | 50 | Intrinsic viscosity 0.49 | 50 | SB | 12.5 |
| Example 4 | Syndiotactic | 75 | Intrinsic viscosity 0.49 | 25 | SB | 18.75 |
| Example 5 | Syndiotactic | 90 | Intrinsic viscosity 0.49 | 10 | MAS | 60 |
| Example 6 | Syndiotactic | 30 | Intrinsic viscosity 0.49 | 70 | SBS | 35 |
| Comparative Example 1 | Atactic | 50 | Intrinsic viscosity 0.49 | 50 | None | — |
| Comparative Example 2 | Atactic | 75 | Intrinsic viscosity 0.49 | 25 | None | — |
| Comparative Example 3 | Atactic | 50 | Intrinsic viscosity 0.49 | 50 | SB | 12.5 |
| Comparative Example 4 | Atactic | 75 | Intrinsic viscosity 0.49 | 25 | SB | 18.75 |
| Comparative Example 5 | Atactic | 90 | Intrinsic viscosity 0.49 | 10 | MAS | 60 |
| Comparative Example 6 | Atactic | 30 | Intrinsic viscosity 0.49 | 70 | SBS | 35 |
| Comparative Example 7 | Syndiotactic | 2 | Intrinsic viscosity 0.49 | 98 | None | — |

| | Solvent-dipping Test (left for 1 week at room temperature[3]) | | | | |
|---|---|---|---|---|---|
| No. | Acetone | Carbon tetrachloride | Gasoline | Ethyl acetate | n-Heptane |
| Example 1 | B | B | A | B | A |
| Example 2 | A | A | A | A | A |
| Example 3 | B | B | A | B | A |
| Example 4 | A | A | A | A | A |
| Example 5 | A | A | A | A | A |
| Example 6 | B | B | B | B | B |
| Comparative Example 1 | D | D | D | D | B |
| Comparative Example 2 | D | D | D | D | B |
| Comparative Example 3 | D | D | D | D | B |
| Comparative Example 4 | D | D | D | D | B |
| Comparative Example 5 | D | D | D | D | B |
| Comparative Example 6 | D | D | C | D | B |
| Comparative | C | C | B | C | B |

TABLE 1-continued

Example 7

Note:
1) PPE resin = Polyphenylene ether resin
2) Parts by weight based on the total amount of Component A and Component B as 100 parts by weight
3) A ... No change in appearance
B ... Swollen (Increase in weight: not more than 10%)
C ... Swollen (Increase in weight: 10% or more)
D ... Dissolved

TABLE 2

| No. | Component A Styrene-base Polymer | wt % | Component B PPE resin | | wt % | Component E Rubber-like elastomer | part by weight | Bending strength (kg·G/cm$^2$) | Tensile fracture elongation (%) |
|---|---|---|---|---|---|---|---|---|---|
| Example 1 | Syndiotactic | 50 | Intrinsic viscosity | 0.49 | 50 | None | — | 1500 | 5.4 |
| Example 2 | Syndiotactic | 75 | Intrinsic viscosity | 0.49 | 25 | None | — | 1300 | 3.5 |
| Comparative Example 8 | Syndiotactic | 100 | None | | — | None | — | 1000 | 1.3 |
| Comparative Example 9 | Syndiotactic | 75 | Intrinsic viscosity | 0.24 | 25 | None | — | 700 | 1.3 |

TABLE 3

| No. | Component A Styrene-based Polymer | wt % | Component B PPE resin | | wt % | Component E Kind | part by weight* | Bending strength (kg·G/cm$^2$) | Tensile fracture elongation (%) | Izod impact strength (kg·G·cm/cm) |
|---|---|---|---|---|---|---|---|---|---|---|
| Example 3 | Syndiotactic | 50 | Intrinsic viscosity | 0.49 | 50 | SB | 12.5 | 1100 | 25 | 13 |
| Example 4 | Syndiotactic | 75 | Intrinsic viscosity | 0.49 | 25 | SB | 18.75 | 940 | 16 | 16 |
| Comparative Example 10 | Syndiotactic | 100 | None | | — | SB | 12.5 | 800 | 2.1 | 7 |
| Comparative Example 11 | Syndiotactic | 50 | Intrinsic viscosity | 0.49 | 50 | SBS | 100 | Immoldable | Immoldable | Immoldable |
| Example 7 | Syndiotactic | 90 | Intrinsic viscosity | 0.49 | 10 | GF** | 43 | 1520 | — | 5 |
| Example 8 | Syndiotactic | 30 | Intrinsic viscosity | 0.49 | 70 | GF CaCo$_3$ | 43 15 | 1550 | — | 4 |
| Example 9 | Syndiotactic | 90 | Intrinsic viscosity | 0.49 | 10 | GF talc | 130 65 | 1760 | — | 4 |

*Parts by weight based on the total amount of Component A and Component B as 100 parts by weight
**Glass fiber

TABLE 4

| No. | Component A Styrene-based*1 Polymer | wt % | Component B Intrinsic*2 viscosity of PPE resin | wt % | Component C Flame*3 retarder | part*4 by weight | Component D Flame-retardant aid | part*4 by weight |
|---|---|---|---|---|---|---|---|---|
| Example 10 | Syndiotactic | 50 | 0.49 | 50 | a | 12 | Sb$_2$O$_3$ | 3 |
| Comparative Example 12 | Syndiotactic | 100 | — | — | a | 24 | Sb$_2$O$_3$ | 6 |
| Example 11 | Syndiotactic | 75 | 0.49 | 25 | b | 15 | Sb$_2$O$_3$ | 5 |
| Example 12 | Syndiotactic | 50 | 0.49 | 50 | a | 12 | Sb$_2$O$_3$ | 3 |
| Example 13 | Syndiotactic | 50 | 0.49 | 50 | a | 12 | Sb$_2$O$_3$ | 3 |
| Example 14 | Syndiotactic | 50 | 0.49 | 50 | c | 16 | Sb$_2$O$_3$ | 4 |
| Example 15 | Syndiotactic | 50 | 0.49 | 50 | a | 16 | Sb$_2$O$_3$ | 4 |
| Example 16 | Syndiotactic | 75 | 0.49 | 25 | a | 30 | Sb$_2$O$_3$ | 8 |
| Example 17 | Syndiotactic | 50 | 0.49 | 50 | a | 16 | Sb$_2$O$_3$ | 4 |
| Comparative Example 13 | Atactic | 50 | 0.49 | 50 | a | 12 | Sb$_2$O$_3$ | 3 |
| Example 18 | Syndiotactic | 90 | 0.49 | 10 | a | 24 | Sb$_2$O$_3$ | 6 |

| No. | Component E Rubber-like*5 elastomer | part*4 by weight | Inorganic*5 filler | part by*4 weight | Flame Retardance Test UL 94 | Thickness (Inch) |
|---|---|---|---|---|---|---|
| Example 10 | — | — | — | — | V-0 | 1/32 |
| Comparative Example 12 | — | — | — | — | V-0 | 1/32 |
| Example 11 | — | — | talc | 15 | V-0 | 1/32 |
| Example 12 | — | — | CaCO$_3$ | 15 | V-0 | 1/32 |
| Example 13 | — | — | GF | 43 | V-0 | 1/32 |

TABLE 4-continued

|  |  |  |  |  |  |  |
|---|---|---|---|---|---|---|
| Example 14 | SB | 15 | — | — | V-0 | 1/32 |
| Example 15 | MAS | 15 | — | — | V-0 | 1/32 |
| Example 16 | MAS | 40 | GF | 75 | V-0 | 1/32 |
| Example 17 | SB | 15 | talc | 15 | V-0 | 1/32 |
| Comparative Example 13 | — | — | — | — | V-0 | 1/32 |
| Example 18 | — | — | GF mica | 130 65 | V-0 | 1/32 |

*[1]Styrene-based polymer
Syndiotactic: Polystyrene having syndiotactic configuration, obtained in Reference Example 1
Atactic: Idemitsu Polystyrene US305, product by Idemitsu Petrochemical Co., Ltd.
*[2]PPE resin: Polyphenylene ether resin obtained in Reference Example 2
*[3]Flame retarder
a: Polytribromostyrene . . . Pyrocheck 68 PB, produced by Nissan Ferro Co.
b: Decabromodiphenyl ether . . . Trade Name: SAYTEX 102, produced by Ethyl Corporation
C: Poly(dibromophenylene oxide) . . . GLC PO-64P, produced by Great Lakes, Ltd.
*[4]Proportion to the total amount of Component A and Component B as 100 parts by weight
*[5]Rubber-like elastomer
SB: Styrene-grafted butadiene rubber (particle diameter: 0.7 μm, Name of Product on an trial basis: Metablen IP-2, produced by Mitsubishi Rayon Co., Ltd.)
MAS: Methyl methacrylate-n-butyl acrylate-styrene copolymer (Trade Name: KM 330, produced by Rohm & Haas Company)
*[6]Inorganic filler
GF: Glass fiber (Length of fiber: 3 mm, Diameter: 13 μm, CS03 MA 429A, produced by Asahi Fiber Glass Co., Ltd.)
talc: (Average particle diameter: 0.6 μm, Talc FFR, produced by Asada Seifun Co.)
$CaCO_3$: Calcium carbonate having average particle diameter of 2 μm

TABLE 5

| No. | Tensile Fracture elongation (%) | Bending strength (kg/cm) | Gasoline-Dipping*[1] Test |
|---|---|---|---|
| Example 10 | 4 | 1470 | A |
| Comparative Example 12 | 1 | 980 | A |
| Example 11 | 4 | 1260 | A |
| Example 12 | 5 | 1250 | A |
| Example 13 | 5 | 1600 | A |
| Example 14 | 20 | 1060 | A |
| Example 15 | 18 | 1070 | A |
| Example 16 | 16 | 1520 | A |
| Example 17 | 16 | 2070 | A |
| Comparative Example 13 | 3 | 1290 | C |
| Example 18 | — | 1730 | A |

*[1]Left for one week at room temperature
A . . . No change in appearance
B . . . Swollen (not less than 10% of increase in weight)
C . . . Dissolved

TABLE 6

| No. | Intrinsic viscosity of PPE (dl/g) | SPS/PPE Ratio (by weight) | Way of stretching | Temp. of stretching (°C.) | Draw ratio (times) | Annealing* | Tensile strength (kg/mm$^2$) | Elongation at break (%) | Tensile modulus (kg/cm$^2$) |
|---|---|---|---|---|---|---|---|---|---|
| Example 19 | 0.32 | 95/5 | Uniaxially | 120 | 4 | No | 20 | 25 | 144000 |
| Example 20 | 0.32 | 95/5 | Uniaxially | 120 | 2 | No | 17 | 10 | 125000 |
| Example 21 | 0.32 | 95/5 | Uniaxially | 120 | 4 | Done | 21 | 25 | 148000 |
| Comparative Example 14 | 0.32 | 99/1 | Uniaxially | 120 | 4 | No | 15 | 4 | 133000 |
| Example 22 | 0.32 | 80/20 | Uniaxially | 120 | 4 | No | 22 | 28 | 154000 |
| Example 23 | 0.32 | 80/20 | Biaxially | 120 | 3.5 × 3.5 | No | 15 | 14 | 53000 |
| Example 24 | 0.32 | 80/20 | Biaxially | 120 | 3.5 × 3.5 | Done | 15 | 14 | 54000 |
| Example 25 | 0.49 | 50/50 | Biaxially | 170 | 3.5 × 3.5 | No | 20 | 17 | 52000 |
| Example 26 | 0.49 | 15/85 | Biaxially | 190 | 3.5 × 3.5 | No | 22 | 20 | 50000 |
| Comparative Example 15 | 0.49 | 5/95 | No sheet formed | — | — | — | — | — | — |

Notes:
*Conditions for annealing: 250° C., 30 seconds

What is claimed is:

1. A stretched molding formed by stretching a molding of a styrene polymer composition comprising (A) 10 to 98% by weight of a styrene polymer having sydiotactic configuration with a proportion of a racemic pentad of 30% or more and (B) 90 to 2% by weight of a polyphenylene ether having an intrinsic viscosity of 0.28 dl/g or more at 30° C. in chloroform.

2. The stretched molding according to claim 1, wherein a draw ratio at least in uniaxially stretching is at least 1.5 times.

3. The stretched molding according to claim 1, wherein a draw ratio in biaxially stretching is at least 1.2 times in each direction.

4. The stretched molding according to claim 1, wherein the styrene polymer is selected from the group consisting of polystyrene, poly(methylstyrene), poly(ethylstyrene) poly(isopropylstyrene), poly(tert-butylstyrene), poly(divinyl benzene), poly(chlorostyrene), poly(bromostyrene), poly(fluorostyrene), poly(methoxystyrene), poly(ethoxystyrene) and copolymers thereof.

5. The stretched molding according to claim 1, wherein the polyphenylene ether is of a formula

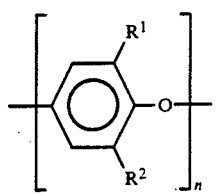

wherein R¹ and R² are the same or different and each is an alkyl group having 1 to 6 carbon atoms, an aryl group having 6 to 8 carbon atoms, a halogen atom or a hydrogen atom and n is 50 to 500.

6. The stretched molding according to claim 1, wherein the polyphenylene ether is selected from the group consisting of poly(2,6-dimethyl-1,4-phenylene)ether; poly(2,6-diethyl-1,4-phenylene)ether; poly(2-methyl-6-ethyl-1,4-phenylene)ether; poly(2-methyl-6-isopropl-1,4-phenylene)ether; poly(2-methyl-1,4-phenylene)ether; poly(2,6-dichloro-1,4-phenylene)ether; poly(2-ethyl-6-bromo-1,4-phenylene)ether and poly (2-phenyl-1,4-phenylene)ether.

7. The stretched molding according to claim 1, where said (A) is 30 to 95% by weight and polystyrene and said (B) is 70 to 5% by weight of a polyphenylene ether selected from the group consisting of poly(2,6-dimethyl-1,4-phenylene)ether; poly(2,6-diethyl-1,4-phenylene)ether; poly(2-methyl-6-ethyl-1,4-phenylene)ether; poly(2-methyl-6-isopropl-1,4-phenylene)ether; poly(2-methyl-1,4-phenylene)ether; poly(2,6-dichloro-1,4-phenylene)ether; poly(2-ethyl-6-bromo-1,4-phenylene)ether and poly(2-phenyl-1,4-phenyleneether.

* * * * *